United States Patent [19]

Lee

[11] 4,335,466
[45] Jun. 15, 1982

[54] METHOD AND APPARATUS FOR MEASURING IRRADIATED FUEL PROFILES

[75] Inventor: David M. Lee, Los Alamos, N. Mex.

[73] Assignee: The United States of America as represented by the United States Department of Energy, Washington, D.C.

[21] Appl. No.: 134,352

[22] Filed: Mar. 27, 1980

[51] Int. Cl.³ .............................................. G21C 17/00
[52] U.S. Cl. .................................................... 376/257
[58] Field of Search .............. 176/19 R; 250/390–392, 250/303, 366, 367, 358–360, 374, 375, 385, 388, 363 S; 376/257

[56] References Cited

U.S. PATENT DOCUMENTS

| | | | |
|---|---|---|---|
| 3,432,656 | 3/1969 | Smith et al. | 250/358 R |
| 3,717,765 | 2/1973 | Hiller | 176/19 R |
| 3,860,822 | 1/1975 | Owens, Jr. | 250/363 S |
| 3,873,840 | 3/1975 | Ellis | 250/392 |
| 3,970,853 | 7/1976 | Kuhl et al. | 250/363 S |
| 3,984,690 | 10/1976 | Marshall et al. | 250/374 |
| 4,103,164 | 7/1978 | East | 250/374 |
| 4,229,654 | 10/1980 | Arya et al. | 176/19 R |

OTHER PUBLICATIONS

ANS Transactions (1965 Ann Meeting) (6/65) West et al. pp. 104–105.
ANS Transactions (1965 Ann. Meeting) (6/65) Nodvick pp. 103–104.
Nucl. Inst. & Meth (u3)(1973) pp. 141–145 Hargrove et al.
LA-6923(ISPO-9) UC-15 (1/78) Hsue et al. Nondestructive Methods for Irradiated Fuels.

*Primary Examiner*—Sal Cangialosi
*Attorney, Agent, or Firm*—Elizabeth O. Slade; Paul D. Gaetjens; Richard G. Besha

[57] ABSTRACT

A new apparatus is used to substantially instantaneously obtain a profile of an object, for example a spent fuel assembly, which profile (when normalized) has unexpectedly been found to be substantially identical to the normalized profile of the burnup monitor Cs-137 obtained with a germanium detector. That profile can be used without normalization in a new method of identifying and monitoring in order to determine for example whether any of the fuel has been removed. Alternatively, two other new methods involve calibrating that profile so as to obtain a determination of fuel burnup (which is important for complying with safeguards requirements, for utilizing fuel to an optimal extent, and for storing spent fuel in a minimal amount of space). Using either of these two methods of determining burnup, one can reduce the required measurement time significantly (by more than an order of magnitude) over existing methods, yet retain equal or only slightly reduced accuracy.

16 Claims, 7 Drawing Figures

METHOD AND APPARATUS FOR MEASURING IRRADIATED FUEL PROFILES

BACKGROUND OF THE INVENTION

The present invention relates generally to a method and apparatus for very quickly measuring data which is directly correlatable with fuel burnup and relates more particularly to a method and apparatus for obtaining such measurements very quickly on spent fuel from nuclear reactors. It is a result of a contract with the Department of Energy (Contract No. W-7405-ENG-36).

In order to comply with various safeguards agreements, inspection organizations such as NRC (Nuclear Regulatory Commission) and IAEA (International Atomic Energy Agency) need a capability of very quickly and accurately monitoring in a non-destructive manner the fissile content of spent fuel assemblies in storage pools. Presently, measurements of the content of residual and produced fissile material are not directly measured but rather are inferred by measuring particular data which is correlated to burnup (which is a measure of nuclear reactor fuel consumption, expressed either as a percent of fuel atoms that have undergone fission or as the amount of energy produced per unit weight of fuel).

It is known in the art that the amounts of certain fission products which are present in a fuel assembly, such as Cs-137, $^{144}$Ce-Pr, and Ru-106, are proportional to burnup and can be used as burnup monitors. See, for example, S. T. Hsue et al., Los Alamos Scientific Report LA-6923 (ISPO-9) (1978).

It is known in the art that the gross gamma activity of a spent fuel assembly depends both upon the cooling time (i.e., time measured from discharge from the reactor) and upon the intensity of various fission product gamma rays. The gamma rays from a spent fuel assembly can be divided into two categories, (1) gamma rays from direct fission products and (2) gamma rays from isotopes resulting from neutron capture on direct fission products. The number of the type (1) gamma rays is known to be proportional to the reactor neutron flux; and the number of the type (2) gamma rays is known to be approximately proportional to the square of the reactor neutron flux. However, only type (1) gamma rays have been found to be proportional to burnup. Thus, a gross gamma activity measurement of a spent fuel assembly will not in general be expected to give an accurate measurement of burnup due to the possible interference of the type (2) gamma rays, described above. In all detectors in which gross gamma activity is measured, the detector response is proportional to the sum of the gamma rays emitted, which depends upon cooling time and intensities of the fission products (which depend upon burnup and operating history). However, corrections to the data for these factors is not generally possible because the relative contribution of each factor is not known. Thus, it generally cannot be known prior to experimental determination or complicated calculations when, if ever, a gross measurement of total emitted gamma rays will agree with the true burnup.

Typically, the preferred method for measuring relative burnup has been to use high resolution gamma ray spectroscopy (HRGRS) and to perform a series of measurements of the intensity of gamma rays having a particular energy at various points along the length of the fuel assembly and then to use the integrated area of that profile and an established calibration curve of calculated burnup vs. integrated Ge detector response (measuring, for example, the 661 keV gamma ray of Cs-137) to provide the corresponding burnup value. The use of a germanium detector to monitor the intensity of the 661 keV gamma ray of Cs-137 as a function of axial position along a fuel assembly provides a very accurate (2-6%) measure of relative burnup but takes a long period of time and requires a multichannel analyzer system, a mechanical scanning system, and a collimator assembly. An alternative scanning technique is to employ a cadmium telluride detector for the profile measurements and then to calibrate the profile by use of a germanium detector for a gamma-ray absolute intensity measurement, normally at one point in the center of the profile. Although both of these techniques provide statistically satisfactory data, both require a quite long period of time for the measurements, often one hour or longer per assembly, and both require collimators.

A 1965 publication entitled Richard J. Nodvik, "Evaluation of Gamma Scanning as a Tool for Determining Fuel-Burnup Distribution in Large Power-Reactor Cores," Transactions, 1965 Annual Meeting, American Nuclear Society, described the use of a miniature ion chamber inserted in-core during reactor operation for gross gamma scanning, (a technique which was being evaluated as a tool for determining burnup distributions within large power reactor cores). However, although that reference initially mentioned the term "distribution," there was no further discussion of the subject. And it was found that the gamma activity generally overestimated the burnup in assemblies that occupied the central region of the core (where higher burnup normally occurs) and underestimated the burnup in assemblies that formed the periphery of the core (where lower burnup normally occurs), implying that a measured profile would be flatter than the true burnup profile. The agreement between the gross gamma intensity and burnup was not good, deviations having ranged from $-16$ to $+13\%$. The agreement must be good at every point in the profile in order to get a good measure of burnup.

Therefore, in view of the above, a single ionization chamber would probably not be expected to be very useful in a method of accurately measuring burnup. Furthermore, the uses of the apparatus of this invention in rapidly measuring burnup and rapidly measuring an identifying characteristic which is used to determine whether a fuel assembly has been tampered with would be unobvious.

And although two ionization chambers (each anode having a plurality of wires) have been used in measuring profiles in two coordinates of particle beams, (as described in C. K. Hargrove et al., "A Multiwire Proportional Chamber System for Monitoring the Position and Profile of a Charged Particle Beam," Nuclear Instruments and Methods, 113 (1973), pp. 141-145), the more versatile and less cumbersome apparatus of this invention has not previously been known.

SUMMARY OF THE INVENTION

An object of this invention is an apparatus for and another object is a method for measuring data directly correlatable with the burnup profile of a reactor fuel assembly in a period of measurement time which is less than 10 seconds, rather than nearly an hour or more as is required in the prior art apparatus described above.

Other objects of this invention are a method and apparatus for determining within 10 seconds whether a fuel assembly has been tampered with.

Additional objects, advantages, and novel features of the invention will be set forth in part in the description which follows and in part will become apparent to those skilled in the art upon examination of the following or may be learned by practice of the invention. The objects and advantages of the invention may be utilized and attained by means of the instrumentalities and combinations particularly pointed out in the appended claims.

To achieve the foregoing and other objects and in accordance with the purposes of the present invention, as embodied and broadly described herein, the apparatus of this invention may comprise: a multiplicity of spaced apart substantially identical ionization chambers or proportional chambers, the individual chambers being operably connected so as to provide a multielement detector having a capability of substantially instantaneously obtaining a profile of data which is directly correlatable with burnup as a function of axial position.

Further according to the invention in another embodiment, the multielement detector of the invention is used to substantially instantaneously and nondestructively measure a profile directly correlatable with the burnup profile of an object, for example a spent fuel assembly, with an accuracy equivalent to that of a germanium detector by measuring the gross gamma activity profile with the detector located outside the core of the reactor after a cooling time as short as 9 months and at a voltage such that saturation of the chambers does not occur.

In yet another embodiment, the profile substantially instantaneously obtained by using the multielement detector of the invention is used to determine whether a particular object, for example a fuel assembly, has been tampered with.

The apparatus according to the invention exhibits the following combination of advantages. It has the capability of being used to obtain a relative gross gamma activity profile measurement (which can be used to identify a particular fuel assembly, much like a fingerprint) in a very short period of time, less than 10 seconds. And unexpectedly, it has been found that the integrated area of the normalized gross gamma activity profile obtained with the multielement detector agrees to within the statistics of the normalized profile obtained by employing a germanium detector to measure the intensity of the 661 keV gamma ray of Cs-137 at a multiplicity of axial positions, using a cooling time as short as 9 months, provided that the detector is used out-of-core and provided that saturation of the detector does not occur. And, if desired, an absolute burnup profile can be obtained in a few minutes using the multielement detector if a germanium detector is additionally used to make one measurement for calibration of the normalized profile (referred to above). The apparatus of the invention, furthermore, can operate in both the ionization range and in the proportional range. And, furthermore, no problems which are intrinsic in mechanical scanning are encountered with the apparatus of the invention. The multielement detector is quite versatile, allowing one to measure long and short fuel assemblies with one convenient device, adjustable by varying the number of individual chambers and by varying the spacings between chambers. This device is less cumbersome than a large fixed-size detector employing one chamber with an anode made from a multiplicity of wires. Unlike multi-wire detectors, no sophisticated construction techniques are required; and because individual detectors are used, repair is made easier. Additionally, the electronics setup which is used in cooperation with the multielement detector is much simpler than that needed with HRGRS, can be made portable, and may even be battery powered.

DESCRIPTION OF THE PREFERRED EMBODIMENTS

Although the following description is directed to using Cs-137 as a burnup monitor, other monitors can be used, if desired.

In the methods according to the invention, the detector of the invention is used to obtain substantially instantaneously a gross gamma activity profile of any object having such a profile, for example a fuel assembly. That profile can then be used either (1) later, as is (without normalizing the curve), to identify that fuel assembly, much as a fingerprint is used to identify humans, or (2) it can be used as a relative burnup profile and calibrated in either of two ways (described below) to determine true burnup.

The multielement detector used in the methods of this invention will comprise a plurality of either (1) ionization chambers or (2) proportional chambers. These are current measuring detectors, not pulse counting detectors, and take advantage of the high radiation fields associated with irradiated fuel assemblies so as to provide the fast measurement. Such chambers are well known in the art (see, for example, F. H. Attix et al., *Radiation Dosimetry*, Academic Press, Inc., New York (1960)) and will not be described here in detail. However, in order to minimize the necessity of mathematical corrections for any differences in the detectors, all chambers making up one multielement detector should preferably be substantially identical.

Although the number of individual chambers can be varied broadly, generally at least 5 will be used to form the multielement detector.

When one wishes to obtain a profile, the individual chambers will be preferably located along a substantially straight line, will be spaced apart equidistantly, and will occupy a total length (measured between the two outermost chambers) equal to or greater than the length of the fuel assembly being measured. For convenience, the individual detectors can be mounted on a base.

Figure 1:
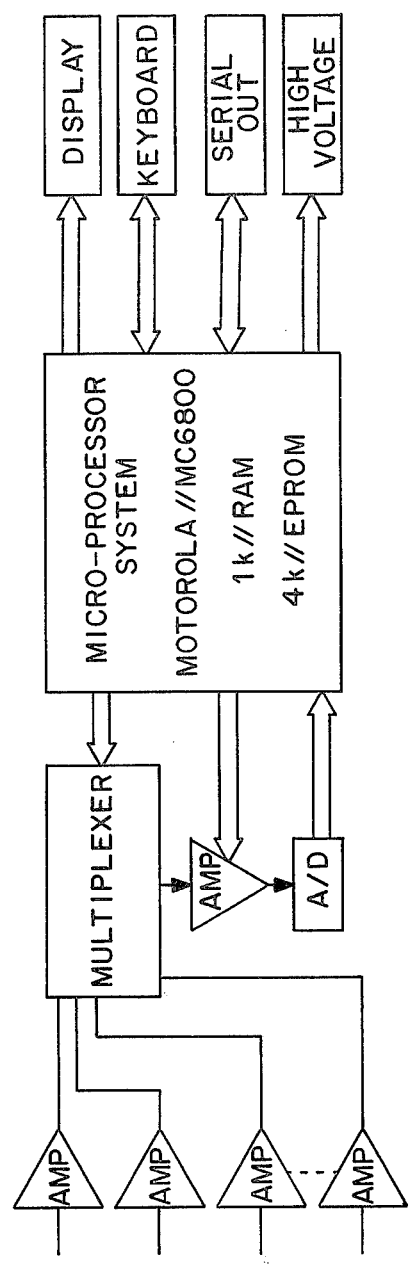
FIG. 1 is a schematic illustration of an electronics system suitable for use with the multielement detector of the invention.

The multielement detector, as described below, can be operated in cooperation with any suitable electronics system which (1) separately amplifies the current signal from each individual current-detecting chamber, (2) converts the signal to an amplified voltage signal, and (3) then multiplexes, digitizes and stores each individual signal in a separate channel of a multiple channel device to which a suitable output device is connectable. In FIG. 1, for example, is shown a schematic diagram of elements of an apparatus which would be suitable for use with a multielement detector. Although a microprocessor system is preferably used, it is not required.

When one uses the multielement detector for either purpose described above, it is required that each of the chamber detectors be operated at a voltage such that saturation of the chamber does not occur. Such a voltage is determined by standard means that are well known in the art, as are described for example in F. H. Attix et al. (cited above).

When the multielement detector is used to obtain a profile to be used for identifying a particular fuel assembly, a gross gamma activity profile will be measured at some initial time $t_o$. This embodiment of the invention is independent of whether or not the axial gross gamma activity profile is in agreement with the true burnup profile. Thus, the measurement can be made in-core, if desired, and need not be made after waiting a particular cooling time. However, for this embodiment of the invention, if a profile is made at a particular time $t_o$ such that the cooling time is less than 9 months, this profile can be used for purposes of identifying that fuel assembly only for a limited period of time, for example up to about 2 months because the profile may vary as a function of cooling time. However, if the cooling time is greater than about 9 months when the first profile is made, the second profile can be made at any later time. After a second profile is made, using the same detector geometry, the two profiles are compared. If they are substantially identical, it is highly likely that there has been no tampering with the fuel assembly. However, if there is a significant difference in the profiles, it is highly likely that some of the fuel has been removed.

In the embodiments of the invention wherein a measure or burnup is to be obtained, the following requirements in the method of using the detector must be fulfilled. The axial gross gamma activity profile must be made with the multielement detector positioned out-of-core, not in-core. Additionally, the measurement should be made only after a cooling time which is greater than about 9 months. When these requirements are met, it is believed that an accurate measure of burnup can be obtained for any type of reactor and for any amount of burnup within the range from about 0 to about 40,000 MWD/MTU. These two requirements must be followed if one wishes to get an accurate measure of burnup because, as described above, an axial gross gamma activity profile measurement will not necessarily show any agreement with burnup. It has experimentally been determined, as described in the Experimental Demonstrations and in the Example below, that when cooling times are as short as 9 months for BWR and PWR fuel assemblies, excellent agreement between Ge detector (Cs-137) profiles and multielement ionization chamber profiles is obtained. One can say with reasonable certainty that such agreement will result whenever cooling times as long as or longer than about 9 months are provided, regardless of the amount of burnup and regardless of the particular reactor involved; however, one cannot predict that such agreement will result when a cooling time much shorter than 9 months is used.

In order to actually determine the true burnup by using the profile which is directly obtained using the multielement detector, one of the following calibration methods should be used. (1) The profile can be used as is (without normalization) in conjunction with (a) the cooling time and (b) an earlier determined calibration curve of (detector response/declared burnup) vs. cooling time to provide a value of burnup which is within 10% of the true burnup. Or, (2) it can be normalized to have a peak value of 1, thus providing (under particular conditions) a normalized gross gamma activity profile which is substantially identical to the normalized profile obtained by using a germanium detector. This normalized profile can then be used instead of the normalized profile obtained by using a germanium detector (measuring Cs-137) for any purpose that a normalized germanium response is useful. If one wishes to establish the true value of burnup, the curve must be calibrated, however, by making one measurement (preferably at the center of the fuel assembly) with the germanium detector.

EXPERIMENTAL DEMONSTRATIONS

In the following demonstrations, one air-filled ionization chamber was used to measure gross gamma activity at a plurality of axial positions along several fuel assemblies, and its normalized profile response was compared with the response of at least one other detector. In Experimental Demonstration 1, the profiles of three BWR fuel assemblies were measured; and in Experimental Demonstration 2, the profiles of three PWR fuel assemblies were measured.

Before these demonstrations were done, there was no incentive provided in the art for building the multielement ionization chamber detector apparatus of the invention because it could not have been expected that the response of even a single ionization chamber would give an accurate measure of burnup for cooling times as short as 9 months.

The value of burnup given on each graph is the declared value provided by the reactor operator, obtained by using the proprietary computer codes of the company. By using the formulas in the Hsue article (cited above), one can (if desired) calculate close approximations to the declared values.

The germanium detector and the beryllium detector were assumed to have responses proportional to burnup. (See Hsue et al. cited above). The beryllium detector measured primarily the 2.186 MeV gamma-ray from the $^{144}$Pr fission product, and the germanium detector measured the 661 keV gamma ray of Cs-137.

EXPERIMENTAL DEMONSTRATION NO. 1

Figure 2:
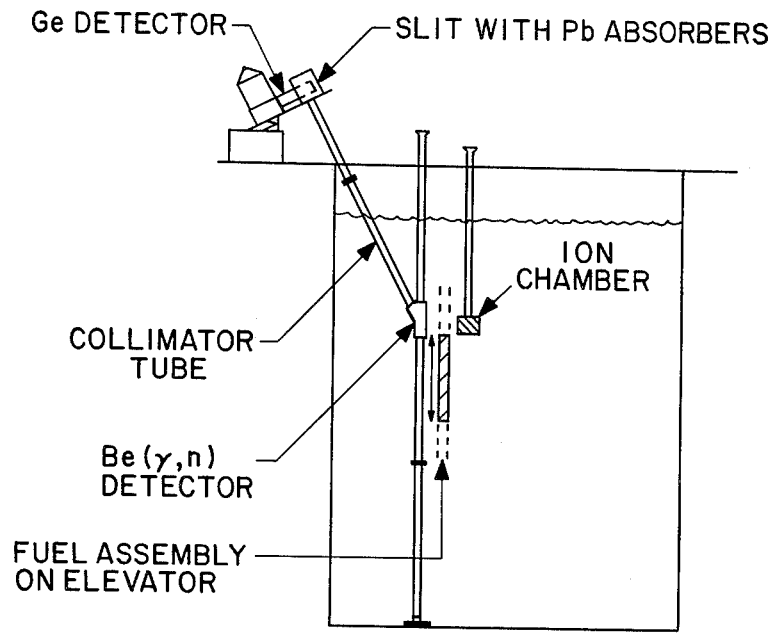
FIG. 2 is a schematic illustration of the experimental setup used in Experimental Demonstration 1.

In this demonstration, several BWR fuel assemblies (each having a cooling time of at least 9 months) were investigated using a single element ionization chamber, a germanium detector, and a beryllium ($\gamma$,n) detector to scan the fuel assemblies. The detectors were stationary and each fuel assembly was moved past the detectors on an elevator. The experimental setup which was used is shown in FIG. 2.

Readings were taken by all three detectors at 16.5 cm intervals along each fuel assembly, the germanium detector and the beryllium detector counting 400–500 seconds for each measurement, whereas the ionization chamber measurement was available as soon as the fuel was in the correct position, normally within about ten seconds.

Figure 3:
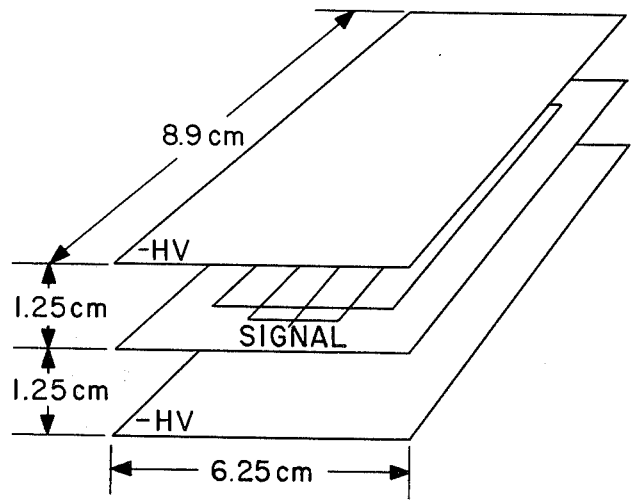
FIG. 3 is a schematic illustration of the single ionization chamber detector used in Experimental Demonstration 1.

A schematic of the ionization chamber detector is given in FIG. 3. It consisted of two outer parallel plates which were operated in the ionization region of the chamber at about −300 volts, and the anode was located between the parallel plates and was made up of wires which were gold-plated tungsten wire having a diameter of 20 μm with a wire-to-wire spacing of 1.25 cm. The active area was 3.8 cm×6.25 cm, and the plate spacing (i.e., the distance between the anode and each cathode plate) was 1.25 cm.

Figure 4:
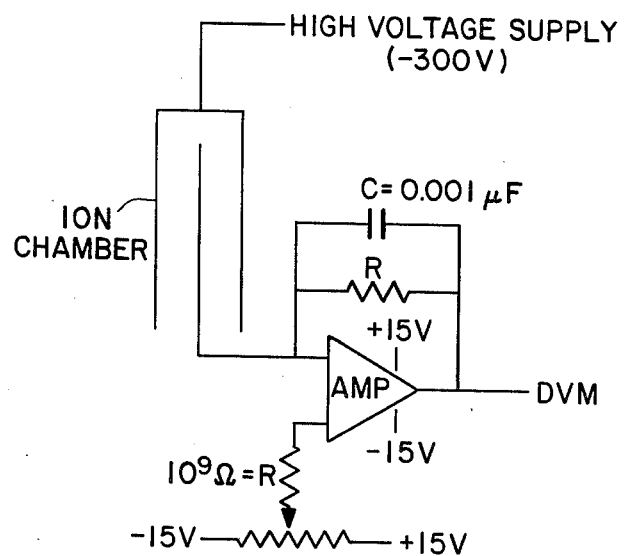
FIG. 4 is a schematic of readout electronics apparatus suitable for use with the detector shown in FIG. 3.

In FIG. 4, the readout electronics for the chamber are illustrated. The electronics included a current-to-voltage amplifier which converted the current signal output from the chamber to an analog voltage and the voltage was read by a digital voltmeter (DVM).

Figure 5:
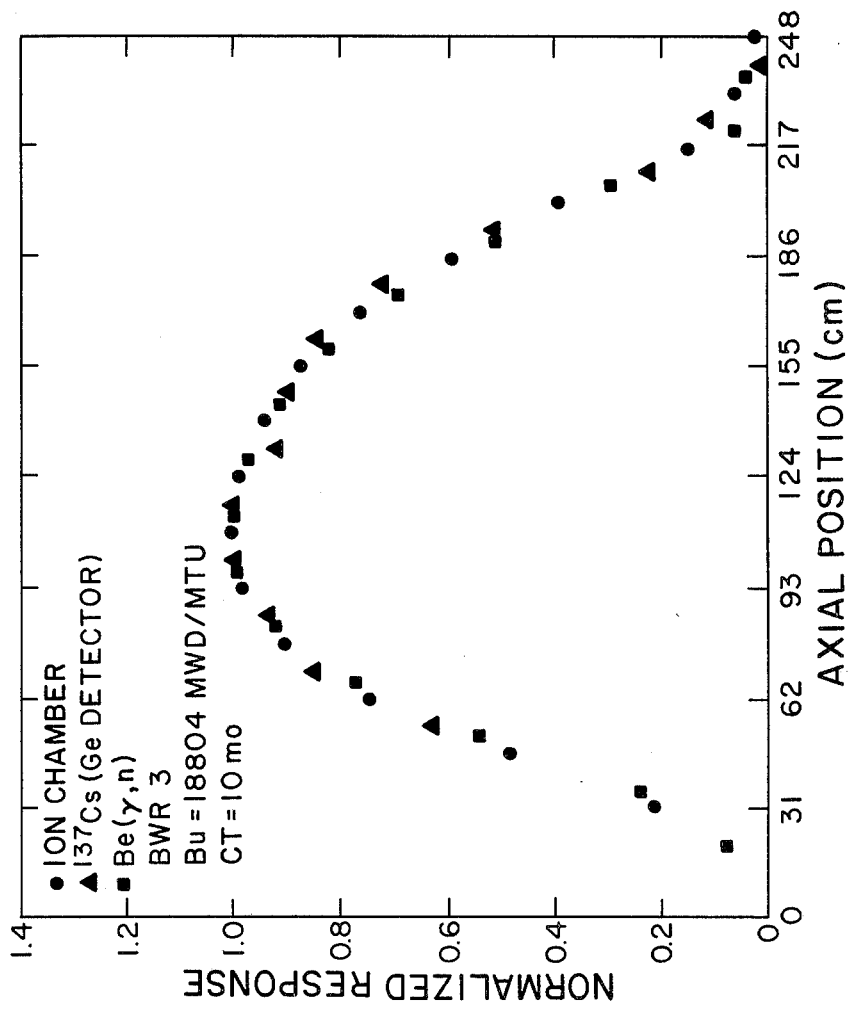
FIG. 5 is a graph of the normalized responses of a single ionization chamber detector, of a germanium detector, and of a beryllium detector vs. axial detector position.

The raw data obtained from each detector was subjected to the following procedure. Because the detectors were not all at the same axial position, the profiles were shifted so that the peak positions coincided. Additionally, the peak value of each profile was normalized to unity. No other changes were made in the raw data. Shown in FIG. 5 are the normalized responses (with peaks shifted) of the three types of detectors which were used to measure a BWR irradiated fuel assembly having a burnup of 18,804 MWD/MTU and a cooling time of 10 months.

Next, in order to obtain a more quantitative comparison of the responses of the three detectors, axial profiles using the three detectors were numerically integrated, the region of integration being 31 cm to 208 cm (corresponding to the length of the fuel assembly).

The results, which are in unexpectedly good agreement, are shown in Table I. For the short cooling times used, these results could not have been predicted.

In obtaining the numbers shown in Table I, linear interpolation was performed between data points. The errors in the ionization chamber data were measured to be 0.5%, based on consecutive scans of the same element. The errors in the Be ($\gamma$,n) detector (2%) and the germanium detector (1–2%) spectra were mainly due to counting statistics. All integrated means agreed to within statistics, although there appeared to be some trend for the Be ($\gamma$,n) and ionization chamber areas to be slightly larger than the Ge detector area (perhaps because the germanium detector was collimated, whereas the other detectors were not).

Therefore, from the results in Table I and in FIG. 5, it can clearly be seen that the normalized response of the ionization chamber detector is in excellent agreement with both the response of the germanium detector and of the beryllium detector when the cooling time of a BWR fuel assembly is as short as about 9 months.

EXPERIMENTAL DEMONSTRATION NO. 2

Irradiated PWR fuel assemblies were next measured, using an ionization chamber detector and a germanium detector. The procedures and experimental setup were similar to those described in Experimental Demonstration No. 1, except that the beryllium detector was omitted and the ionization chamber here used was slightly smaller than that used in Experimental Demonstration No. 1 so that it could be inserted in a 5 cm diameter pipe and then retrieved without the problem of contamination from the water in the storage pond.

TABLE I

| Fuel Assembly | Cooling Time (Months) | Burnup (MWD/MTU) | Integrated Area of Normalized Response (NR) of: | | |
|---|---|---|---|---|---|
| | | | Ge Detector (Cs-137) (NR.cm) | Ionization Chamber Detector (NR.cm) | Be($\gamma$,n) Detector (NR.cm) |
| BWR-1 | 17 | 4356 | 266 ± 20 | 283 ± 7 | 277 ± 27 |
| BWR-2 | 17 | 16658 | 253 ± 18 | 279 ± 7 | 266 ± 26 |
| BWR-3 | 10 | 18804 | 279 ± 20 | 278 ± 7 | 271 ± 27 |

The ionization chamber detector consisted of three plates with a plate separation of 1 cm and a sensitive volume of 10 cm$^3$. The outer plates were held at about −300 volts. The electronics were identical to those used in Experimental Demonstration No. 1, described above.

Several PWR fuel assemblies were measured with the two detectors, and the detector responses (after shifting the peaks to coincide and normalizing the peak value of each axial profile to unity) were in excellent agreement. The areas were numerically integrated from 60 cm to 420 cm, and the results are given in Table II. The agreement was excellent, within the statistics of the germanium detector response.

Figure 6:
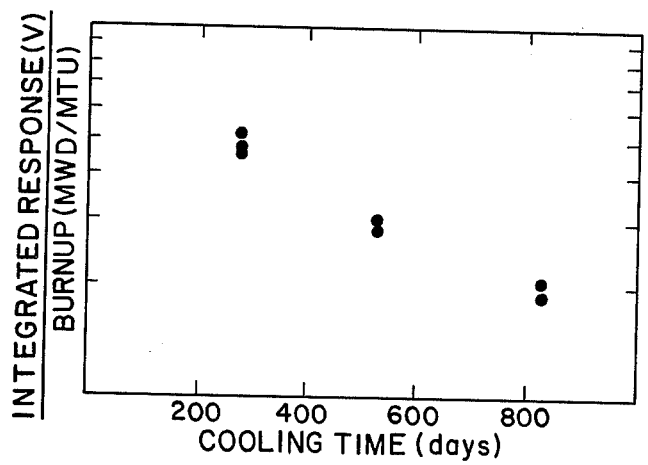
FIG. 6 is a graph of the response of a single ionization chamber detector (normalized by the operator declared burnup) vs. the cooling time for several assemblies.

Next, a fixed scanning geometry was maintained from assembly to assembly so that comparisons could be made between the declared burnup values and the response of the ionization chamber detector. In order to adequately account for different cooling times, the response of the chamber has been normalized by the operator declared burnup and plotted against cooling times in FIG. 6. The chamber response was taken from the center of the profile distribution. The distribution of data points for each cooling time suggests that the response is consistent to within approximately ±10%, clearly suggesting that ionization chambers can operate as stand-alone devices if cooling time information is incorporated in the data analysis.

TABLE II

| Fuel Assembly | Cooling Time (Months) | Burnup (MWD/MTU) | Integrated Area of NR of: | |
|---|---|---|---|---|
| | | | Ge Detector (Cs-137) (NR . cm) | Ionization Chamber Detector (NR . cm) |
| PWR-1 | 15 | 17776 | 250 ± 43 | 249 ± 4 |
| PWR-2 | 9 | 31851 | 272 ± 47 | 269 ± 5 |
| PWR-3 | 9 | 32185 | 271 ± 47 | 278 ± 5 |

TABLE III

| Fuel Assembly | Cooling Time (Months) | Burnup (atom %) | Integrated Area of NR of: | |
|---|---|---|---|---|
| | | | Ge Detector (Cs-137) (NR . in) | Multielement Ionization Detector (NR . in) |
| MTR-1 | 13.75 | 0.346 | 17.15 ± .86 | 16.86 ± .25 |

Following the demonstrations described above, a detector according to the invention made up of a plurality of simultaneously operated individual ionization chambers was made and was tested, as described below.

EXAMPLE

A multielement detector was made from 15 individual and substantially identical air-filled ionization chambers, aligned along a straight line with a distance of 2.4 in. between adjacent detectors, thus providing a multielement detector with an effective sensing length of 36 in. A single high voltage supply was used to operate all of the individual ionization detectors, and the two outer cathode plates in each chamber were held at a voltage of about $-300$ V. The active area of each chamber was 10 cm$^2$ and the anode was located midway between the outer cathode plates, with a total distance between the cathode plates of 1.25 cm. The anode of each detector consisted of three 20 $\mu$m gold-plated tungsten wires separated by 1.25 cm, the wires permitting the capability of operating the chambers in a proportional mode. The anode output from each chamber detector was connected to an individual amplifier in the manner as shown in FIG. 1, thus enabling a profile of all 15 gross gamma intensity measurements to be obtained simultaneously and substantially instantaneously without mechanical scanning.

Figure 7:
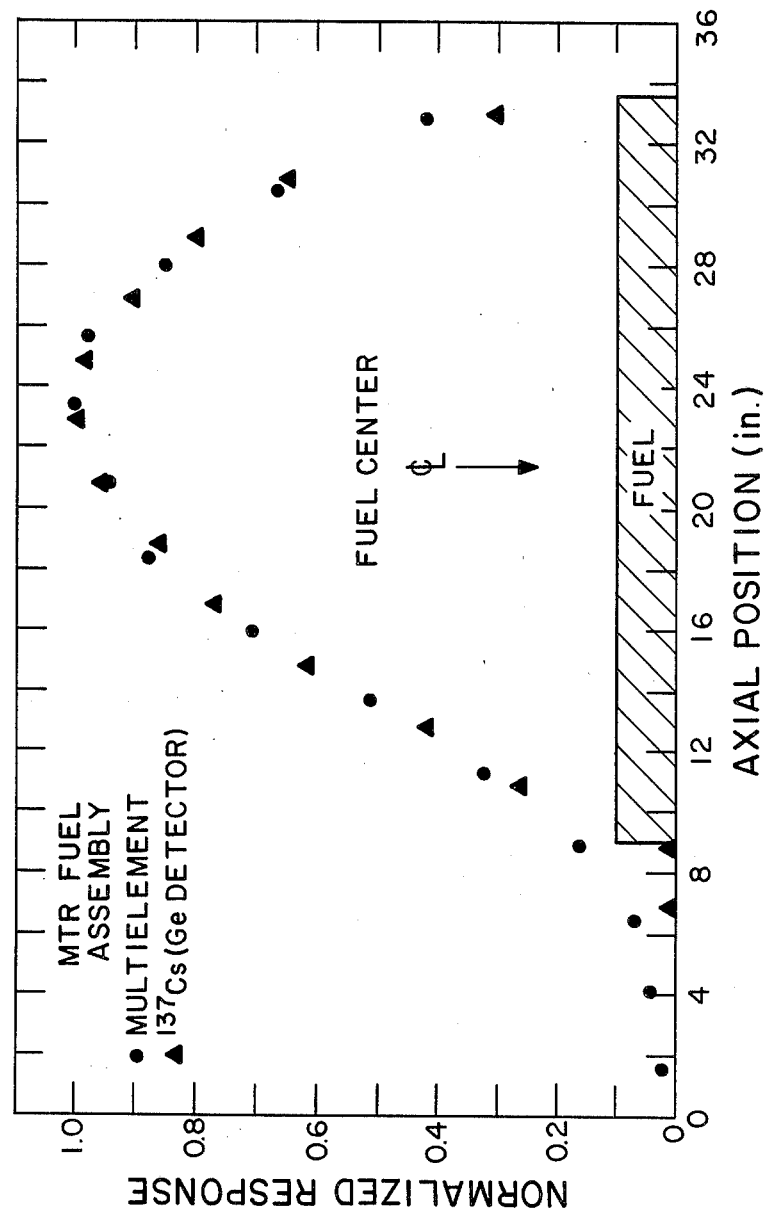
FIG. 7 is a graph of the normalized responses of (1) a multielement detector of the invention, obtained with no mechanical scanning, and (2) a germanium detector using mechanical scanning.

A materials test reactor (MTR) fuel assembly (which was 36 inches long and which had a cooling time of 13.75 months) was measured using the multielement detector of the invention, and its normalized profile is shown in FIG. 7. Additionally, for purposes of comparison, a germanium detector was moved along the fuel assembly at a fixed distance from the fuel assembly. The results of these measurements are also shown in FIG. 7. In Table III, the integrated areas are given. The agreement between the normalized responses of the multielement chamber detector and the germanium detector was excellent. In FIG. 7, the profile is not symmetric about the fuel assembly because control blades were used in the MTR.

From the Experimental Demonstrations and the Example above, because of the excellent agreement in the profiles, it is believed that the detector of the invention can be used to actually replace a germanium detector when MTR, PWR, and BWR fuel assemblies are measured out-of-core after a cooling time of at least 9 months, regardless of their burnup values if a calibration of ionization chamber response vs. burnup is available. However, if desired, a germanium detector can be used to calibrate the gross gamma activity profile obtained with the apparatus of the invention by measuring the response of the germanium detector at one axial position along the fuel assembly.

Normally, fuel must be stored so that the critical mass is not exceeded; and unless an accurate measurement of burnup (or fissile content) is available, the fuel must be stored as if its burnup were 0. An accurate measure of burnup allows one (1) to more efficiently use the available storage space and (2) to more efficiently use the fuel itself than would be possible without this measurement. Because the present invention allows one to obtain accurate burnup measurements much more quickly than was previously possible, with reduced complexity, and with reduced interference with spent fuel storage operation, the present invention will provide for improved utilization of storage space. Additionally, improved use of the fuel itself also can result.

The foregoing description of preferred embodiments of the invention has been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application to thereby enable others skilled in the art to best utilize the invention in various embodiments and with various modifications as are suited for the particular uses contemplated. It is intended that the scope of the invention be defined by the claims appended hereto.

I claim:

1. A method of substantially instantaneously measuring the axial gross gamma activity profile of a irradiated fuel assembly, said method comprising:
   using a multielement detector requiring no collimator and requiring no scanning, said detector comprising a plurality of spaced apart substantially identical individual current-measuring (as opposed to pulse-measuring) detectors to measure substantially instantaneously a profile of gross gamma activity as a function of axial position along said fuel assembly.

2. A method according to claim 1, wherein said current-measuring detectors are selected from the group of detectors consisting of gamma-measuring ionization chambers and gamma-measuring proportional chambers.

3. A method according to claim 2, wherein said object is a spent fuel assembly.

4. A method according to claim 3, wherein said individual current-measuring detectors are ionization chambers, wherein said ionization chambers are located along a straight line and are all spaced an equal distance apart, and wherein the distance between the two outermost individual detectors is equal to the length of said fuel assembly.

5. A method of determining whether a particular fuel assembly has been tampered with, said method requiring less than 10 seconds of total measurement time and comprising:
   measuring substantially instantaneously the axial gross gamma activity profile of said particular fuel assembly according to the method of claim 1 both (a) at some initial time $t_o$, so as to obtain an initial axial gross gamma activity profile, and then (b) at some later time $t_1$, so as to obtain a final axial gross gamma activity profile; and then
   comparing said initial axial gross gamma activity profile with said final axial gross gamma activity profile so as to determine whether any significant differences in said profiles exist.

6. A method according to claim 5 wherein $(t_1 - t_o)$ is less than about 2 months and wherein the cooling time is less than 9 months.

7. A method of determining burnup of an object, said method requiring less than 10 minutes of total measurement time, said method comprising:
   (a) substantially instantaneously measuring the gross gamma activity profile of a fuel assembly according to the method of claim 1, wherein said gross gamma activity profile is measured with said multielement detector located out-of-core and after a cooling time which is at least about 9 months;
   (b) normalizing said gross gamma activity profile obtained in step (a) so as to obtain a normalized gross gamma activity profile having a peak value which is equal to 1.0; and (c) using a previously determined calibration curve of a burnup monitor and using one measurement of the burnup monitor by a gamma spectrometer to convert the normalized profile to the true burnup profile.

8. A method according to claim 7 wherein said burnup monitor is Cs-137.

9. A method according to claim 8, wherein said fuel assembly has a burnup within the range from about 0 to about 40,000 MWD/MTU.

10. A method according to claim 9, wherein said fuel assembly is selected from the group consisting of BWR, PWR, and MTR fuel assemblies.

11. A method according to claim 7 or claim 10 wherein said cooling time is about 9 months and wherein step 7(c) consists of the following steps:
(1) integrating said normalized gross gamma activity profile so as to obtain an integrated value G;
(2) measuring the intensity I, of a particular gamma ray of a burnup monitor with a germanium detector at one axial position along said fuel assembly and determining therefrom the corresponding intensity $I_o$ at the center of said fuel assembly;
(3) multiplying $I_o \times G$ so as to obtain a monitor-calibrated total intensity $I_T$; and
(4) locating $I_T$ on a previously obtained calibration curve of total intensity of said particular gamma ray of said monitor vs. declared burnup, so as to obtain a value of burnup corresponding to $I_T$.

12. A method of determining burnup to within 10% of the declared burnup of a particular object having a known cooling time $T_1$, using a multielement ionization chamber detector as a stand-alone device, said method comprising the method according to claim 1 and including also the following steps:
(a) integrating said profile of gross gamma activity as a function of axial position along said fuel assembly so as to obtain an integrated detector response, R, for said cooling time $T_1$;
(b) locating $T_1$ on a previously experimentally determined graph of (R/declared burnup) vs. cooling time, so as to obtain a corresponding value of burnup.

13. A method according to claim 12 wherein $T_1$ is greater than about 9 months.

14. An apparatus requiring no collimator and no scanning and being suitable for substantially instantaneously measuring the axial gross gamma activity profile of a irradiated fuel assembly, said apparatus comprising a plurality of variably spaced apart substantially identical individual current-measuring (as opposed to pulse-measuring) detectors selected from the group of detectors consisting of gamma-measuring ionization chambers and gamma-measuring proportional chambers operable in cooperation with an electronics system which converts the multiple detector signals into an observable profile.

15. An apparatus according to claim 14, wherein said individual detectors are located along a straight line, are spaced apart equidistantly, and wherein said individual detectors occupy a total length equal to or greater than the length of an object being measured.

16. An apparatus according to claim 15, wherein said detectors are adjustably mounted on a base and wherein said individual detectors occupy a total length equal to the length of an object being measured.

* * * * *